(12) United States Patent  (10) Patent No.: US 6,917,824 B2
Kobayashi  (45) Date of Patent: Jul. 12, 2005

(54) FOLDING PORTABLE TELEPHONE CAPABLE OF SELECTIVELY USING FREE STOP FUNCTION AND ONE TOUCH OPEN FUNCTION

(75) Inventor: Fumiyuki Kobayashi, Saitama (JP)

(73) Assignee: NEC Corporation, Tokyo (JP)

( * ) Notice: Subject to any disclaimer, the term of this patent is extended or adjusted under 35 U.S.C. 154(b) by 401 days.

(21) Appl. No.: 10/150,935

(22) Filed: May 21, 2002

(65) Prior Publication Data

US 2002/0173281 A1 Nov. 21, 2002

(30) Foreign Application Priority Data

May 21, 2001 (JP) ........................................ 2001-151683

(51) Int. Cl.$^7$ ................................................. H04B 1/38
(52) U.S. Cl. ............................... 455/575.3; 455/575.1; 455/90.3; 379/433.13
(58) Field of Search .......................... 455/575.3, 575.1, 455/90.3, 90.2; 379/433.13, 428.01, 447

(56) References Cited

U.S. PATENT DOCUMENTS

| 5,668,867 A | * | 9/1997 | Nagai | .................... 379/433.13 |
| 5,706,332 A | * | 1/1998 | Nagai | ...................... 455/575.3 |
| 5,923,751 A | | 7/1999 | Ohtsuka et al. | |
| 6,459,887 B2 | * | 10/2002 | Okuda | ........................ 455/90.1 |

FOREIGN PATENT DOCUMENTS

| GB | 2 300 880 A | 11/1996 |
| GB | 2 334 068 A | 8/1999 |
| GB | 2 355 043 A | 4/2001 |
| JP | 2582531 B2 | 11/1996 |
| JP | 2658906 B2 | 6/1997 |
| JP | 09-205287 | 8/1997 |
| JP | 11-041328 A | 2/1999 |
| JP | 11-234377 A | 8/1999 |
| JP | 2002-300242 | 10/2002 |
| WO | WO 01/13529 A1 | 2/2001 |

* cited by examiner

*Primary Examiner*—Vivian Chin
*Assistant Examiner*—Minh D. Dao
(74) *Attorney, Agent, or Firm*—Foley & Lardner LLP

(57) ABSTRACT

In a folding portable telephone comprising a first housing (11), a second housing (12), and a hinge portion (13) which is fixed on the first housing (11) and which is for rotatably coupling the second housing (12) to the first housing (11). The hinge portion (13) comprises an operating portion (16). The second housing (12) is opened from a first angle position for indicating a closed condition to a second angle position for indicating a predetermined angle position, responsive to an operation of the operating portion (16). On the contrary, the second housing (12) is kept at one of the first angle position, the second angle position, and a third angle position between the first and the second angle positions, when an operation of the operating portion (16) is not available.

10 Claims, 8 Drawing Sheets

FOLDING PORTABLE TELEPHONE CAPABLE OF SELECTIVELY USING FREE STOP FUNCTION AND ONE TOUCH OPEN FUNCTION

BACKGROUND OF THE INVENTION

The present invention relates to a portable telephone, in particular to a folding portable telephone.

In a conventional folding portable telephone, it is difficult for a user to open two housings only by one hand, when the conventional folding portable telephone in closed condition is opened by the user. In other words, it is generally required for the user to open the two housings by using both hands. As a result, it is very inconvenient for the user to open the conventional folding portable telephone on a condition that the user can use only one hand, and the like. In order to solve such a problem, a proposal is made, in unexamined Japanese patent publication Hei 11-41328, namely, No.41328/1999, about a conventional technique that a folding portable telephone can be opened into a condition for talking by an operation of only one hand. Therein, disclosed is a "folding portable telephone" including a push button provided on an end surface of a hinge portion thereof and having a function to be automatically opened from a folded condition thereof by a user's pushing the push button (what is called, one touch open function).

The folding portable telephone disclosed therein comprises a first housing, a second housing, a hinge portion for joining the first and the second housings rotatably to each other, a spring for rotatably pushing the first and the second housings in the direction of being opened to each other, a locking mechanism for locking the first and the second housings into a folded condition, and a push button provided on an end surface of the hinge portion and pushed for releasing a lock of the folded condition by the locking mechanism. The folding portable telephone has a structure to be opened at a stretch from the folded condition thereof (hereunder called dosed condition, namely, a condition that the folding portable telephone is closed by rotating either the first or the second housing) into a shape for talking (hereunder called opened condition, namely, a condition that the folding portable telephone is opened by rotating either the first or the second housing) by a force of the spring for rotatably pushing, when the push button is pushed on.

On the other hand, in unexamined Japanese patent publication Hei 11-234377, namely, No. 234377/1999, disclosed is "folding compact electronic equipment" having an open and close operation supporting mechanism of a case that upper and lower case members are hinged to be able to be folded into one case. As a result, the folding compact electronic equipment becomes capable of being opened or dosed like one touch by one hand.

The open and close operation supporting mechanism of the folding compact electronic equipment comprises a magnet for the upper case member and a magnet for the lower case member each located on the opposite portions of the upper and lower case members to each other in the folded condition, respectively. At least one of those of both the magnets is movable against the other magnet thereof by pushing and pressing operation from the outside. In addition, both the magnets have such polarity that the magnets repulse to each other at the time of the pushing and pressing operation while the magnets attract to each other at the time of releasing the pushing and pressing operation.

Further, in Japanese patent publication No. 2582531, disclosed is a "folding portable telephone" that an upper housing and a lower housing including an antenna portion and a hook switch are hinged. The folding portable telephone comprises housing hooking means. The folding portable telephone can be rendered to be a folded condition by hooking the upper and the lower housings using the housing hooking means.

The folding portable telephone disclosed in the Japanese patent publication No. 2582531 further comprises hooking releasing means for releasing and driving the upper and the lower housings from the folded condition into an opened condition, an antenna projecting means for projecting a predetermined part of the antenna portion from the lower housing responsive to the releasing and driving operation, and hook switch driving means for driving, responsive to the releasing and driving operation, the hook switch so that the folding portable telephone may be an off-hook condition. The housing hooking means include a first magnet located in the lower housing, and a second magnet located in the upper housing so that the second and the first magnets attract to each other by a magnetic force larger than a hooking releasing force of the hinge portion in the folded condition of the folding portable telephone. On the other hand, the hooking releasing means are a magnet moving structure for moving the first magnet in position so that a magnetic force generated between the first and the second magnets may become smaller than the hooking releasing force of the hinge portion.

Furthermore, in Japanese patent publication No. 2658906, disclosed is a "folding portable telephone" comprising first and second housings which have a telephone receiver or a telephone transmitter, respectively, and which are rotatably coupled to each other by a hinge portion.

The folding portable telephone disclosed in the Japanese patent publication No. 2658906 comprises housing pushing means, housing hooking means, housing hooking releasing means, an antenna, antenna pushing means, antenna hooking means, antenna hooking releasing means, a hook switch, and a slide button. The housing pushing means always push first and second housings to be opened at a certain angle. The housing hooking means comprise first and second magnets located in the first and the second housings, respectively, which hook the first and the second housings at a folded condition thereof. Therein, the first and the second magnets attract to each other at a hooked condition by a magnetic force larger than a pushing force of the pushing means. The housing hooking releasing means releases the hooked condition by the housing hooking means. Namely, the housing hooking releasing means move the first or the second magnet in position so that a magnetic force generated between the first and the second magnets may become smaller than the pushing force of the pushing means. The antenna is rotatably provided in the second housing by the hinge portion. The antenna pushing means always push the antenna to be opened at a certain angle against the second housing. The antenna hooking means hooks the antenna at a folded condition of the antenna at the side of the second housing. Namely, the antenna hooking means comprise an antenna magnet located in the antenna, and a housing magnet located in the second housing so that the housing magnet and the antenna magnet attract to each other at a hooked condition by a magnetic force larger than a pushing force of the antenna pushing means. The antenna hooking releasing means release the hooked condition by the antenna hooking means. Namely, the antenna hooking releasing means move the housing magnet in position so that a magnetic force generated between the antenna magnet and the housing magnet may become smaller than the pushing force of the antenna pushing means. The hook switch makes the folding portable telephone be a talking condition. The slide button is capable of being pushed from the outside of the second housing. The housing hooking releasing means, the antenna hooking releasing means, the hook switch, and the slide button are composed of a coupling member located slide-movably in the second housing.

However, one of the conventional techniques mentioned above has the following problem. Namely, in the folding portable telephone having the one touch open function, opening force is automatically applied on the folding portable telephone, in a case that it is opened by a hand of an user himself without pushing the push button. As a result, even in the case, the folding portable telephone having the one touch open function is inevitably opened at a stretch from the closed condition thereof into the opened condition thereof. It is therefore difficult for users to use the folding portable telephone having the one touch open function with ease. This is because the folding portable telephone having the one touch open function does not have a merit that the other conventional folding portable telephones have. Namely, the folding portable telephone having the one touch open function does not have a function to keep an angle between the first and the second housings at a free position between the closed condition and the opened condition (hereunder, called "free stop function"). In addition, in a case that the folding portable telephone having the one touch open function is opened by a hand of an user himself without pushing the push button, the folding portable telephone having the one touch open function is in danger of being dropped from the hand of the user by a reaction of the one touch open. As a result, in such a case, it is necessary for the user to open the above-mentioned folding portable telephone with the folding portable telephone being holded by both hands of the user. Accordingly, the user is largely burdened with this.

Under these circumstances, it is strongly desired that an improved folding portable telephone is provided to have both the free stop function and the one touch open function capable of transferring the folding portable telephone from a closed condition into an opened condition by operation of only one hand, so that the improved folding portable telephone can be used very easily.

SUMMARY OF THE INVENTION

It is therefore an object of the present invention to provide a folding portable telephone that is capable of selectively using the free stop function and the one touch open function, so that utility of the folding portable telephone is improved.

It is another object of the present invention to provide a folding portable telephone that has a structure capable of being opened by one hand, so that operability of the folding portable telephone is improved.

It is yet another object of the present invention to provide a folding portable telephone that is capable of selectively using the free stop function and the one touch open function, so that burden for an user can be lightened to improve maintenance of the folding portable telephone.

Other objects of the present invention will become clear as the description proceeds.

According to an aspect of the present invention, there is provided a folding portable telephone comprising: a first housing (11), a second housing (12), and a hinge portion (13) which is fixed on the first housing (11) and which is for rotatably coupling the second housing (12) to the first housing (11). The hinge portion (13) comprises an operating portion (16). The second housing (12) is opened from a first angle position for indicating a closed condition to a second angle position for indicating a predetermined angle position, responsive to an operation of the operating portion (16). On the contrary, the second housing (12) is kept at one of the first angle position, the second angle position, and a third angle position between the first and the second angle positions, when an operation of the operating portion (16) is not available.

The hinge portion (13) comprises a first hinge portion (15) and a second hinge portion (14). Herein, the first hinge portion (15) is corresponding to a second hinge unit 15 described later in the detailed description of the preferred embodiments while the second hinge portion (14) is corresponding to a first hinge unit 14 described later in the detailed description of the preferred embodiments. The first hinge portion (15) is located on an end of the hinge portion (13) and has the operating portion (16). By the first hinge portion (15), the second housing (12) rotates from the first angle position to the second angle position, responsive to an operation of the operating portion (16). The second hinge portion (14) is located on the other end of the hinge portion (13) and is capable of rotating the second housing (12) from the first angle position to the second angle position. The second hinge portion (14) keeps the second housing (12) at one of the first angle position, the second angle position, and the third angle position, when the operation of the operating portion (16) is not available.

The first hinge portion (15) co-axially rotatably couples a first housing side coupling portion (11a) integrally formed in the first housing (11) with a second housing side coupling portion (12a) integrally formed in the second housing (12). A guiding trench (12d) is formed in the second housing side coupling portion (12a).

The first hinge portion (15) comprises a fixed disk (41), a first fixed tube (42), a first disk (44b), a first coupling portion (44a), a first spring (43), a second disk (45), and a lock-releasing button (16). Herein, the first disk (44b) is corresponding to a third disk body 44b of a third disk 44 described later in the detailed description of the preferred embodiments while the first coupling portion (44a) is corresponding to a tubular portion 44a of the third disk 44 described later in the detailed description of the preferred embodiments. Further, the second disk (45) is corresponding to a fourth disk 45 described later in the detailed description of the preferred embodiments. Furthermore, the first fixed tube (42) is corresponding to a second fixed tube 42 described later in the detailed description of the preferred embodiments.

The fixed disk (41) is fixed within the first housing side coupling portion (11a). The first fixed tube (42) is located within the second housing side coupling portion (12a). The first disk (44b) is located within the first fixed tube (42). One end of the first coupling portion (44a) is connected to the first disk (44b). On the other hand, the other end of the first coupling portion (44a) penetrates through the first fixed tube (42) and is then coupled to the fixed disk (41) movably in the direction of one axis (L). Within the first fixed tube (42), both ends of the first spring (43) are fixed to the first fixed tube (42), the first disk (44b), respectively. The first spring (43) thereby pushes the first fixed tube (42) rotatably against the first disk (44b). Within the first fixed tube (42), the second disk (45) is hooked to the first disk (44b). A hole (42e) is formed in the first fixed tube (42) to have a length over which the second disk (45) moves in the direction of one axis (L). A guiding rib (45a) is formed in the second disk (45) so that the second disk (45) may penetrate the hole (42e) and move over the length of the hole (42e). The lock-releasing button (16) is corresponding to the operating portion (16) and is coupled to the second disk (45). When the lock releasing button (16) is pushed on, the lock releasing button (16) makes the second disk (45) move in the direction of one axis (L) and then makes the first fixed tube (42) and the second disk (45) rotate by rotatably pushing force of the first spring (43). The lock-releasing button (16) thereby releases the second disk (45) from being hooked to the first disk (44b).

Responsive to pushing on of the lock-releasing button (16), the guiding rib (45a) is hooked to the guiding trench (12d) of the second housing side coupling portion (12a). Further, the second housing (12) rotates from the first angle position to the second angle position.

The first hinge portion (15) further comprises a second spring (46). When the second housing (12) is at the first angle position, the second spring (46) pushes the second disk (45) to the first disk (44b) within the first fixed tube (42) so that the second disk (45) may be kept hooked to the first disk (44b).

The second hinge portion (14) co-axially rotatably couples a third housing side coupling portion (11c) integrally formed in the first housing (11) with a fourth housing side coupling portion (12b) integrally formed in the second housing (12). A projecting portion (12f) is formed in the fourth housing side coupling portion (12b).

The second hinge portion (14) comprises a shaft (35), a third disk (32), a second fixed tube (33), a fourth disk (31), and a third spring (34). Herein, the third disk (32) is corresponding to a second disk 32 described later in the detailed description of the preferred embodiments while the fourth disk (31) is corresponding to a first disk 31 described later in the detailed description of the preferred embodiments. Further, the second fixed tube (33) is corresponding to a first fixed tube 33 described later in the detailed description of the preferred embodiments.

The shaft (35) is formed in line with one axis (L). The third disk (32) has a trench (32b) into which the projecting portion (12f) of the fourth housing side coupling portion (12b) is inserted. The third disk (32) rotates with the shaft (35) being an axis of rotation. The second fixed tube (33) is fixed within the third housing side coupling portion (11c). The fourth disk (31) is formed within the second fixed tube (33). The fourth disk (31) is hooked to the third disk (32), when the second housing (12) is at the first or the second angle position. On the contrary, the fourth disk (31) is not hooked to the third disk (32), when the second housing (12) is at the third angle position. The third spring (34) is formed within the second fixed tube (33). The third spring (34) pushes the fourth disk (31) to the third disk (32) so that the second housing (12) may be kept at one of the first angle position, the second angle position, and the third angle position.

When the fourth disk (31) is hooked to the third disk (32), the second hinge portion (14) informs an user of the result of hooking of the fourth disk (31) to the third disk (32) by sound.

A predetermined clearance is kept between the projecting portion (12f) of the fourth housing side coupling portion (12b) and the trench (32b) of the third disk (32). Above-mentioned sound for informing the user of the result of hooking is a sound generated by a collision of the projecting portion (12f) with the trench (32b), when the fourth disk (31) is hooked to the third disk (32).

DETAILED DESCRIPTION OF THE PREFERRED EMBODIMENTS

Figure 1:
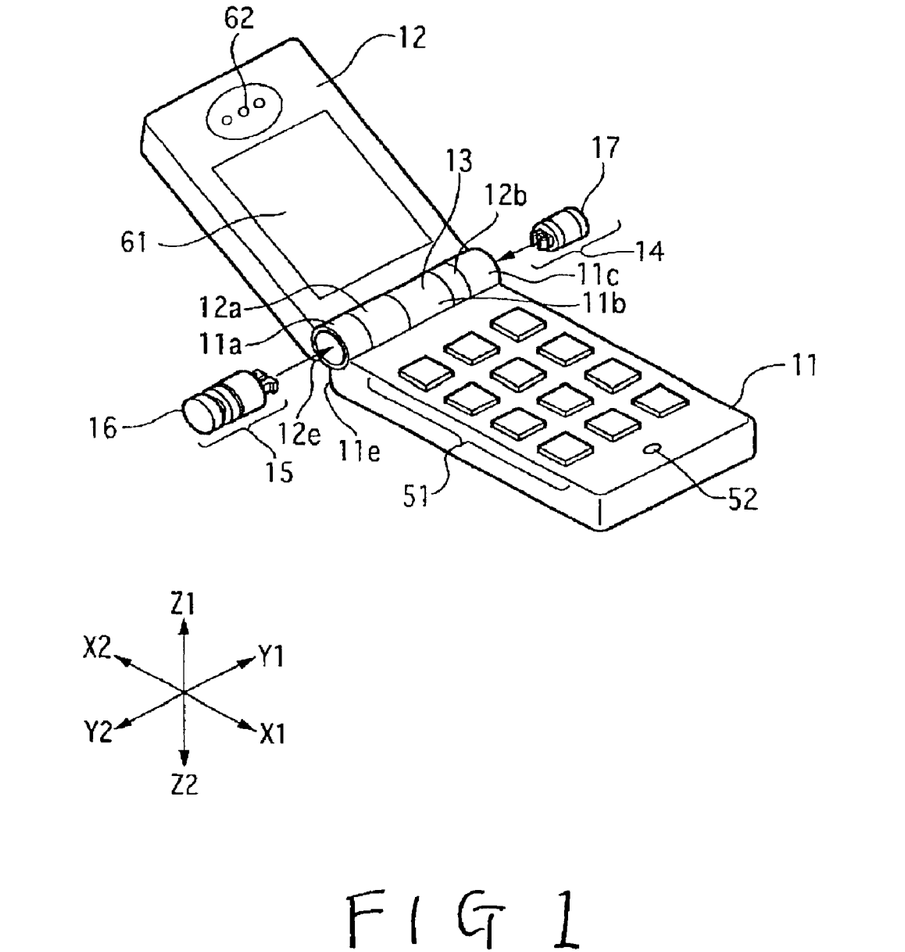
FIG. 1 is a perspective view for schematically showing a folding portable telephone according to a preferred embodiment of the present invention, in which the folding portable telephone is an opened condition.
Figure 2A:
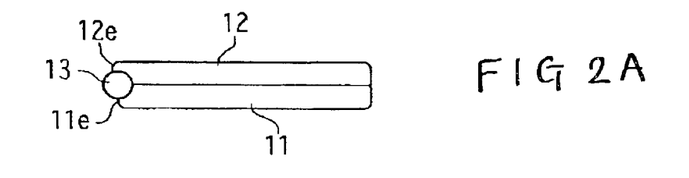
FIG. 2A is a side view for schematically showing the folding portable telephone according to the preferred embodiment of the present invention, in which the folding portable telephone is a folded (closed) condition.
Figure 2B:
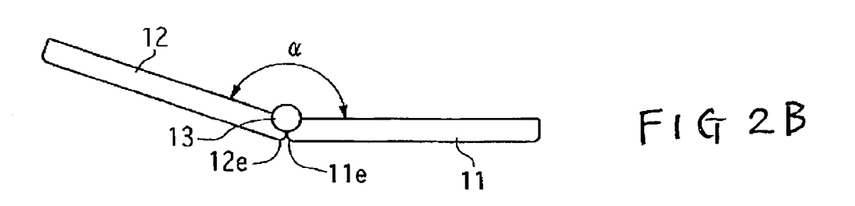
FIG. 2B is a side view for schematically showing the folding portable telephone according to the preferred embodiment of the present invention, in which the folding portable telephone is in condition for use (an opened condition)
Figure 2C:
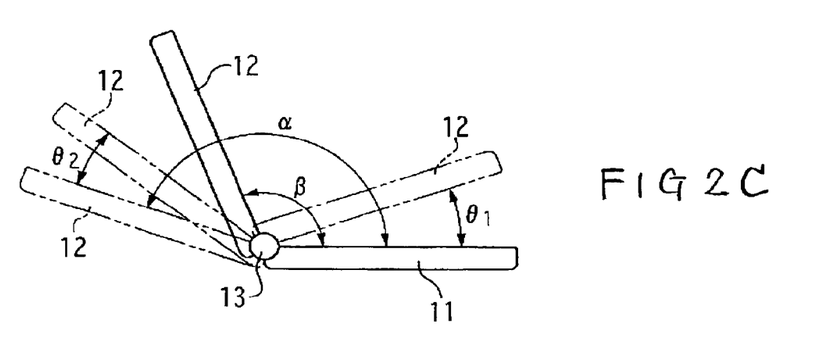
FIG. 2C is a side view for schematically showing the folding portable telephone according to the preferred embodiment of the present invention, in which a range of angles between the first and the second housings of the folding portable telephone at a free stop condition between the closed condition and the opened condition.

Referring to FIGS. 1 and 2, description will proceed to a folding portable telephone according to a preferred embodiment of the present invention. FIG. 1 is a perspective view for schematically showing the folding portable telephone according to the preferred embodiment of the present invention, in which the folding portable telephone is an opened condition.

As illustrated in FIG. 1, the folding portable telephone according to the preferred embodiment comprises a first housing 11 having an operating portion 51 formed in an inner surface of the first housing 11, a second housing 12 having a display portion 61 formed in an inner surface of the second housing 12, and a hinge portion 13 which is coupled with the first and the second housings 11 and 12. A receiver portion 62 is formed on an inner surface of the second housing 12 which is positioned above the display portion 61 (in the direction of X2). On the other hand, a transmitter portion 52 is formed on an inner surface of the first housing 11 which is positioned under the operating portion 51 (in the direction of X1).

The first and the second housings 11 and 12 are rotatably (capable of being opened or closed) coupled to each other by the hinge portion 13. In other words, the hinge portion 13 rotatably couples the second housing 12 to the first housing 11. Herein, the folding portable telephone according to the preferred embodiment has conditions of open and close operation, namely, a closed condition and an opened condition. The "closed condition" is such a condition that the inner surface of the first housing 11 and the inner surface of the second housing 12 come into contact with each other by the second housing 12 being rotated in the closed direction through the hinge portion 13, so that the folding portable telephone according to the preferred embodiment has been closed. On the contrary, the "opened condition" is such a condition that the folding portable telephone according to the preferred embodiment has been opened by the second housing 12 being rotated in the opened direction through the hinge portion 13, namely, a condition that a user of the folding portable telephone according to the preferred embodiment becomes capable of talking.

The hinge portion 13 is composed of tubular portions 11a, 12a, 11b, 12b, 11c which are adjusted from Y2 to Y1 directions and which have the same outer and inner diameters as each other. The tubular portions 11a, 11b, and 11c are connected with the first housing 11 while the tubular portions 12a and 12b are connected with the second housing 12. A first hinge unit 14 is formed on an end of the hinge portion 13 while a second hinge unit 15 is formed on the other end of the hinge portion 13. The first hinge unit 14 is incorporated into the tubular portions 11c and 12b. The first hinge unit 14 is a hinge unit having a function to keep (maintain) an angle between the first housing 11 and the second housing 12 at a free position between the closed condition and the opened condition, namely, a free stop function. The second hinge unit 15 is incorporated into the tubular portions 11a and 12a. The second hinge unit 15 is a hinge unit having a function to be automatically opened from the folded condition by pushing something like a button, namely, a one touch open function.

Now, referring to FIGS. 2A, 2B and 2C, description is made as regards the free stop function by the first hinge unit 14 and the one touch open function by the second hinge unit 15. Description is, at first, made about the free stop function by the first hinge unit 14.

In a function by the first hinge unit 14, as illustrated in FIG. 2C, when an angle between the first housing 11 and the second housing 12 is not larger than θ1, a closing force (torque in the closed direction) for making the angle between the first and the second housings 11 and 12 be 0°, as illustrated in FIG. 2A, namely, a closing force (torque in the closed direction) for transferring the folding portable telephone into the closed condition (folded condition) is applied by the first hinge unit 14. Further, in a function by the first hinge unit 14, as illustrated in FIG. 2C, when an angle between the first housing 11 and the second housing 12 is not smaller than (α−θ2), an opening force (torque in the opened direction) for making the angle between the first and the second housings 11 and 12 be α (for example. α=160°), as illustrated in FIG. 2B, namely, an opening force (torque in the opened direction) for transferring the folding portable telephone into the opened condition is applied by the first hinge unit 14. Herein, in the opened condition illustrated in FIG. 2B, an edge portion 11e of the first housing 11 connected to the hinge portion 13 and an edge portion 12e of the second housing 12 connected to the hinge portion 13 collide with each other. The opening force is thereby suppressed so that the angle between the first and the second housings 11 and 12 may not become larger than a. Moreover, in the free stop function by the first hinge unit 14, as illustrated in FIG. 2C, when an angle β between the first housing 11 and the second housing 12 is in a range between θ1 and (α−θ2), namely, in a range (θ1<β<(α−θ2)), a torque for keeping the angle β is applied by the first hinge unit 14.

Thus, the first hinge unit 14 is capable of rotating the second housing 12 from the first angle position indicating the angle formed by the second housing 12 of 0° (the closed condition) to a predetermined second angle position indicating the angle formed by the second housing 12 of α (the opened condition). Further, the first hinge unit 14 is capable of keeping one of the first angle position, the second angle position, and a third angle position indicating the angle formed by the second housing 12 of β.

Next, description proceeds to the one touch open function by the second hinge unit 15.

In the one touch open function by the second hinge unit 15, as illustrated in FIG. 2A, in a closed condition (folded condition) that an angle between the first housing 11 and the second housing 12 is 0°, by operating an operating portion like a button, a rotatably pushing force for making the angle between the first and the second housings 11 and 12 be α (for example, α=160°), as illustrated in FIG. 2B, namely, a rotatably pushing force for automatically transferring the folding portable telephone from the closed condition into the opened condition is applied by the second hinge unit 15. Herein, in the opened condition illustrated in FIG. 2B, an edge portion 11e of the first housing 11 connected to the hinge portion 13 and an edge portion 12e of the second housing 12 connected to the hinge portion 13 collide with each other. The rotatably pushing force is thereby suppressed so that the angle between the first and the second housings 11 and 12 may not become larger than α.

Thus, the second hinge unit 15 has the operating portion, responsive to an operation of the operating portion, the second housing 12 rotates from the first angle position to the second angle position.

Figure 3A:
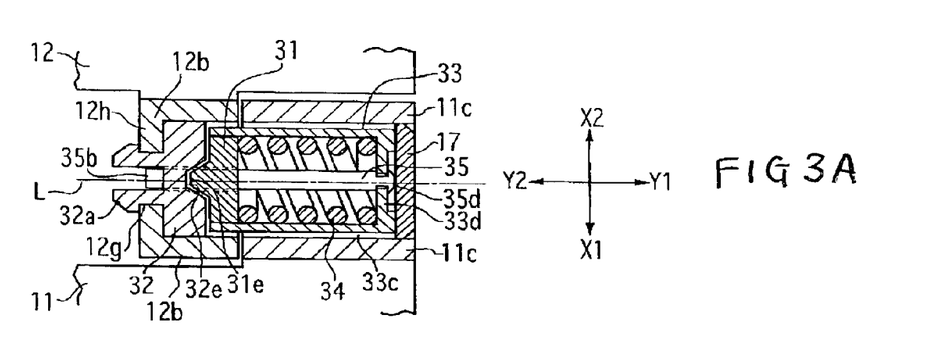
FIG. 3A is a sectional view for schematically showing an internal condition of the first hinge unit of the folding portable telephone according to the preferred embodiment of the present invention, in which an angle between the first and the second housings is 0° to θ1, (α−θ2) to α, respectively.
Figure 3B:
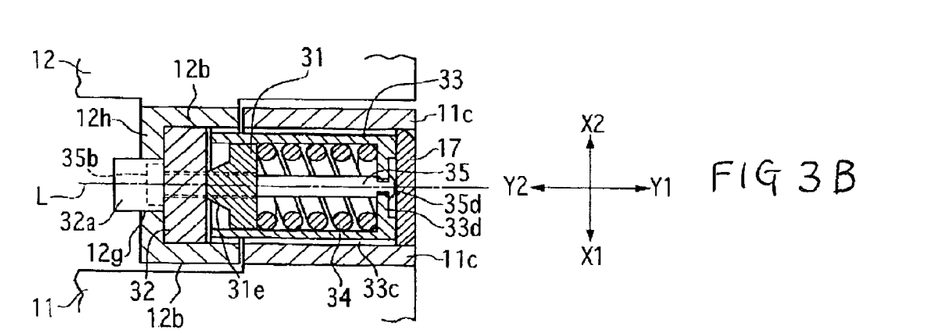
FIG. 3B is a sectional view for schematically showing an internal condition of the first hinge unit of the folding portable telephone according to the preferred embodiment of the present invention, in which an angle between the first and the second housings is β (θ1<β<(α−θ2)) that is an angle between the closed condition and the opened condition.

Next, referring to FIGS. 3, 4 and 5A, 5B and 5C, description is made as regards a constitution of the first hinge unit 14. As illustrated in FIG. 3, the first hinge unit 14 co-axially rotatably couples a tubular portion 11c integrally formed in the first housing 11 with a tubular portion 12b integrally formed in the second housing 12. As illustrated in FIG. 5, two projecting portions 12f positioned in the direction of Z1, Z2 are formed within the tubular portion 12b.

Figure 4:
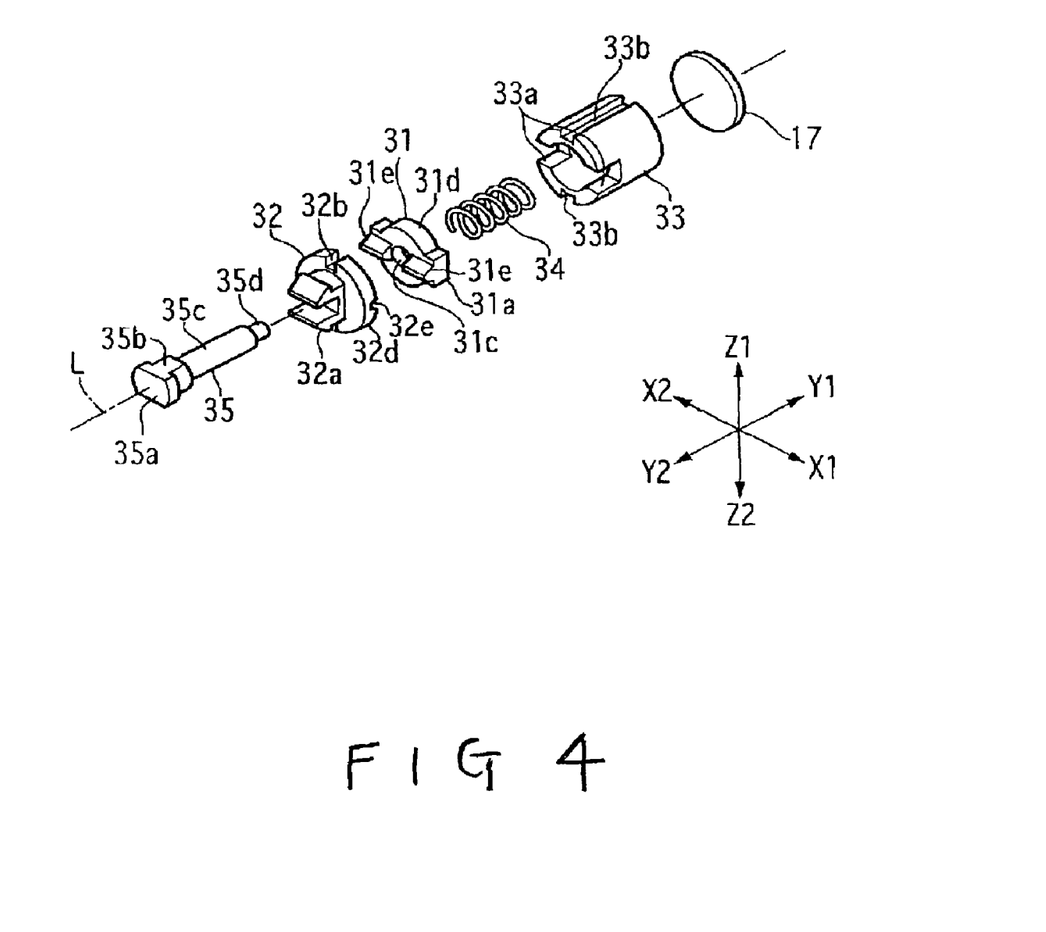
FIG. 4 is a perspective view for schematically showing elements of the first hinge unit of the folding portable telephone according to the preferred embodiment of the present invention.

As illustrated in FIG. 4, the first hinge unit 14 comprises a shaft 35, a second disk 32, a first disk 31, a pressed coil spring 34, a first fixed tube 33, and a cap 17 in line with the direction from Y2 to Y1.

The shaft 35 is formed in line with an axis L. The shaft 35 is composed of a shaft body 35a, an axis 35b having a smaller diameter than that of the shaft body 35a, an axis 35c having a smaller diameter than that of the axis 35b, and an axis 35d having a smaller diameter than that of the axis 35c in line with the direction from Y2 to Y1.

Figure 5A:
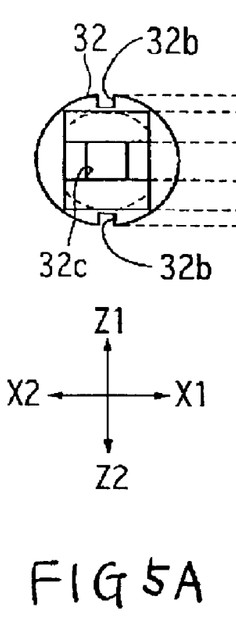
FIGS. 5A, 5B and 5C are plan views for schematically showing a shape of the second disk of the folding portable telephone according to the preferred embodiment of the present invention.
Figure 5B:
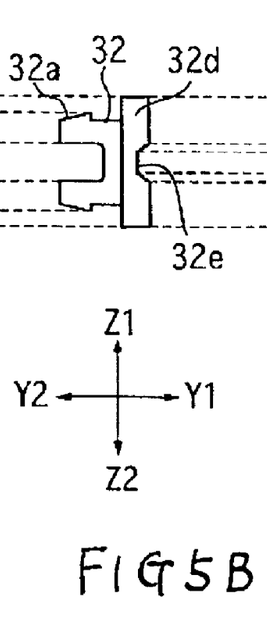
Figure 5C:
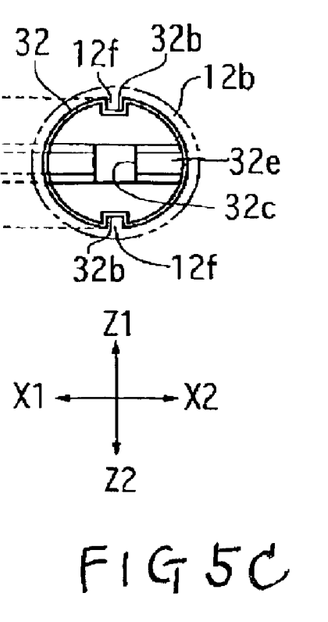

The second disk 32 is composed of a snap fit portion 32a, and a second disk body 32d in line with the direction from Y2 to Y1. The snap fit portion 32a is formed on one surface in the Y2 direction of the second disk body 32d. As illustrated in FIGS. 4 and 5A, 5B and 5C, an axis 35b is inserted into the second disk body 32d and the snap fit portion 32a. As illustrated in FIG. 5C, a hole 32c is formed so that the second disk 32 and the shaft 35 may rotate with the shaft 35 being an axis of rotation. Two trenches 32b positioned in the Z1, Z2 direction of the second disk body 32d and elongated from Y2 to Y1 direction are formed in the second disk body 32d. Further, two concave portions 32e formed on one surface in the Y1 direction of the second disk body 32d and elongated from X1 to X2 direction are formed in the second disk body 32d. The second disk 32 is contained in the tubular portion 12b connected to the second housing 12. Each of the two trenches 32b is fixed and hooked to the two projecting portions 12f formed on inner surface of the tubular portion 12b, respectively. Accordingly, the second disk 32 and the second housing 12 are coupled to each other.

As illustrated in FIG. 4, the first disk 31 is composed of a first disk body 31d and two guiding ribs 31a positioned in the X1, X2 direction of the first disk body 31d. A hole 31c through which the axis 35c is inserted is formed in the first disk body 31d. A convex portion 31e fitted into the concave portion 32e of the second disk 32 is formed in the Y2 direction in each of the two guiding ribs 31a.

The first fixed tube 33 is composed of a tubular portion 33c, and a bottom surface portion 33d in line with the direction from Y2 to Y1, as illustrated in FIGS. 3A and 3B. The pressed coil spring 34 and the first disk 31 are contained in the tubular portion 33c. The pressed coil spring 34 is contained between the first disk 31 and the bottom surface portion 33d in the tubular portion 33c, as illustrated in FIGS. 3A and 3B. Two guiding trenches 33a positioned in the X1, X2 direction are formed in the tubular portion 33c. In addition, two trenches 33b positioned in the Z1, Z2 direction of the tubular portion 33c and elongated in line with the direction from Y2 to Y1 are formed in the tubular portion 33c. The two guiding trenches 33a fixes the two guiding ribs 31a so as not to move in any directions other than Y direction. The two guiding ribs 31a of the first disk 31 can be slidered in the Y direction in line with the two guiding trenches 33a formed in the first fixed tube 33. The first disk 31 is contained within the tubular portion 11c connected to the first housing 11. Each of the two trenches 33b is fixed to each of two projecting portion (not shown) formed in the tubular portion 11c. Accordingly, the first disk 31 and the first housing 11 are coupled and fixed to each other. A hole through which the axis 35d is inserted is formed in the bottom surface portion 33d. The axis 35d is fixed by calking.

Further, as illustrated in FIGS. 3A and 3B, the first disk 31 is always pressure welded to the second disk 32 by a pushing force of the pressed coil spring 34. The snap fit portion 32a formed in the second disk 32 is penetrated through a hole 12g formed in a bottom surface portion 12h of the tubular portion 12b adjacent to the tubular portion 11b and is fixed so as not to come off. As a result, the first hinge unit 14 is fixed to the second housing 12 so as not to come off. Besides, the cap 17 is a dressing cap for covering a portion of the first hinge unit 14 exposed in outward appearance. Further, the first disk 31 is fitted into the second disk 32, when the second housing 12 is at the first angle position or the second angle position. On the contrary, the first disk 31 is not fitted into the second disk 32, when the second housing 12 is at the third angle position. In this case, the pressed coil spring 34 pushes the first disk 31 to the second disk 32 so that one of the first, the second, and the third angle positions may be kept.

Figure 6:
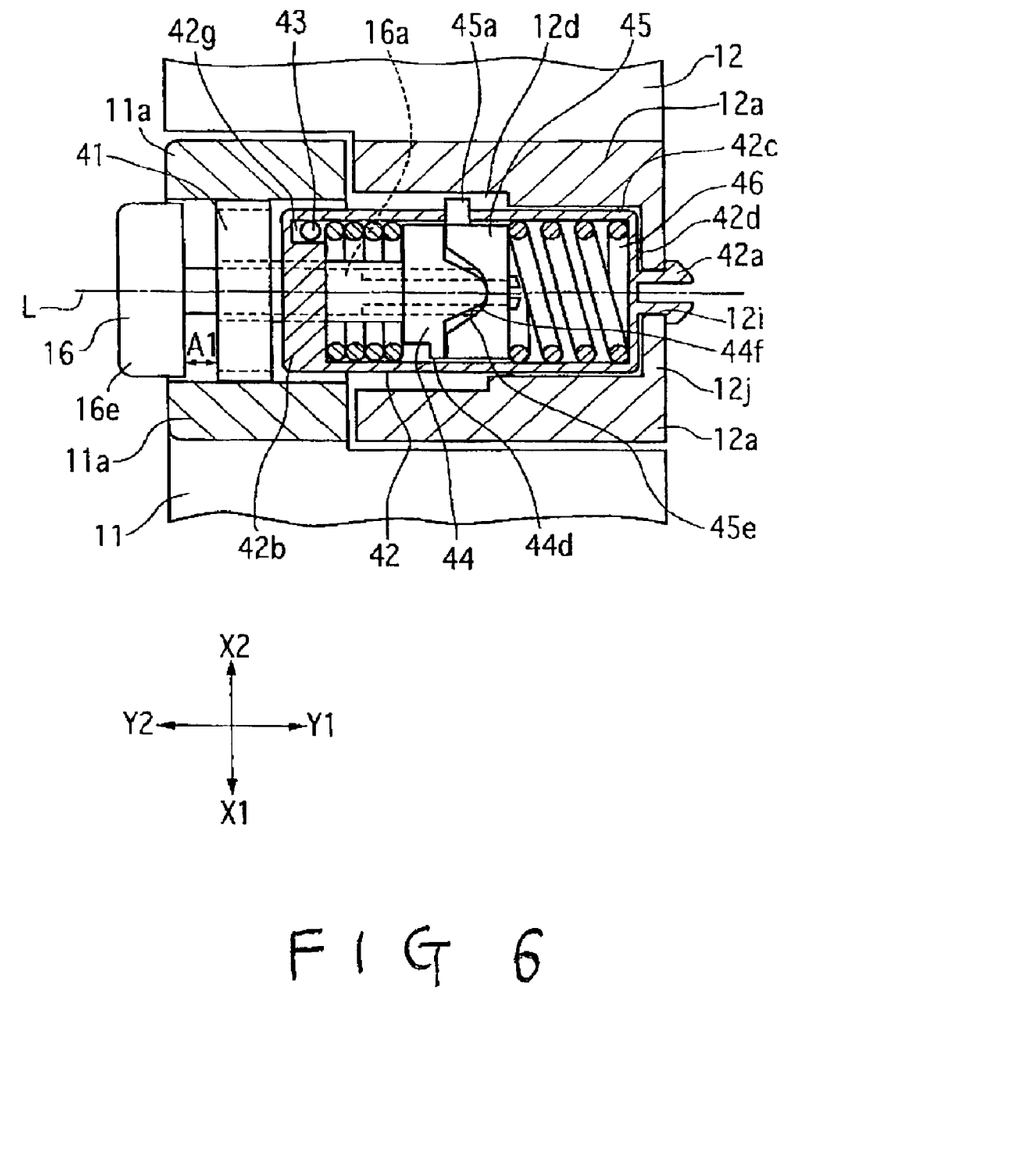
FIG. 6 is a sectional view for schematically showing an internal structure of the second hinge unit of the folding portable telephone according to the preferred embodiment of the present invention.
Figure 7:
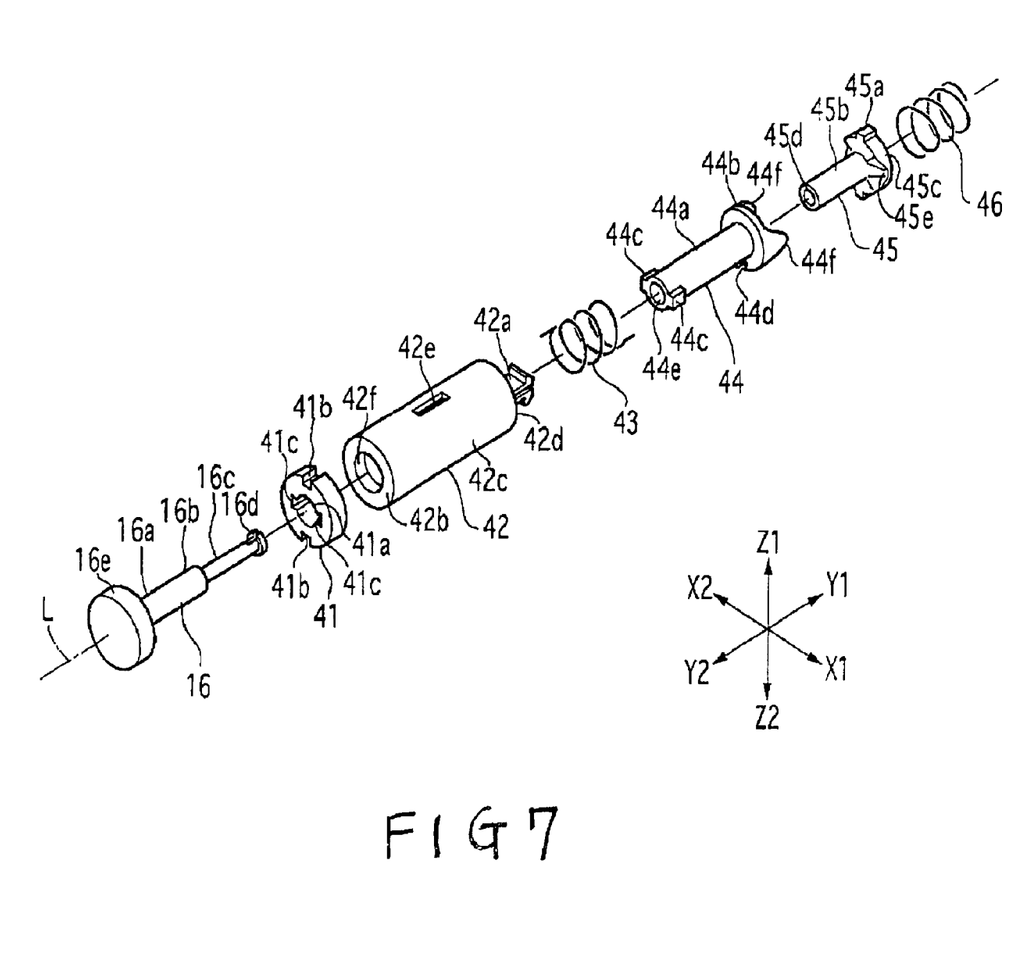
FIG. 7 is a perspective view for schematically showing elements of the second hinge unit of the folding portable telephone according to the preferred embodiment of the present invention.
Figure 8:
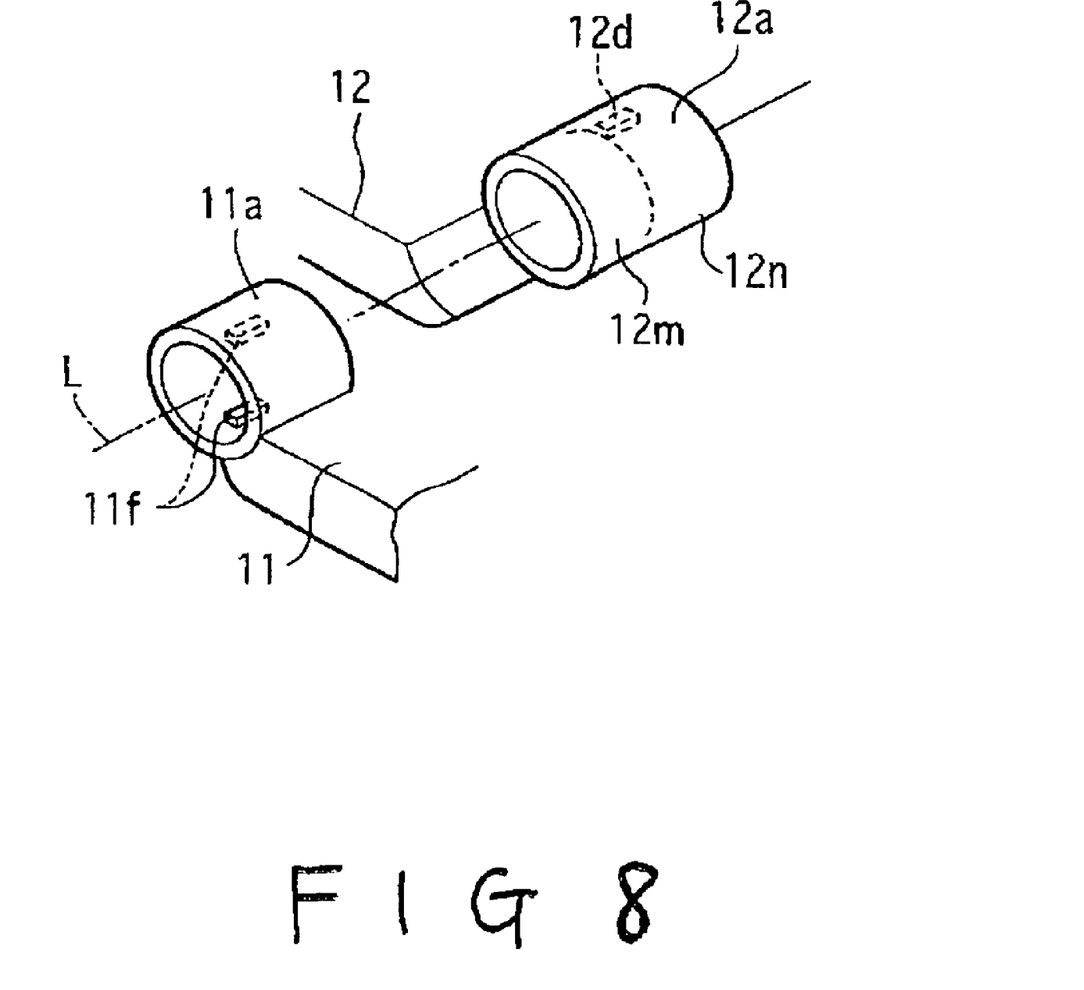
FIG. 8 is a perspective view for schematically showing a tubular portion in which the second hinge unit is incorporated in the hinge of the folding portable telephone according to the preferred embodiment of the present invention.

Next, referring to FIGS. 6, 7 and 8, description is made as regards a constitution of the second hinge unit 15. As illustrated in FIG. 6, the second hinge unit 15 co-axially rotatably couples a tubular portion 11a integrally formed in the first housing 11 with a tubular portion 12a integrally formed in the second housing 12. As illustrated in FIG. 8, two projecting portions 11f positioned in the direction of Z1, Z2 are formed within the tubular portion 11a. The tubular portion 12a is composed of a first tubular portion 12m, and a second tubular portion 12n having an inner diameter smaller than that of the first tubular portion 12m. The first tubular portion 12m is adjacent to the tubular portion 11a while the second tubular portion 12n is adjacent to the tubular portion 11b. A guiding trench 12d which is positioned in the Z1 direction and which has not only a depth larger than a difference between an inner radius of the first tubular portion 12m and an inner radius of the second tubular portion 12n but also a specific length in the Y direction is formed within the second tubular portion 12n of the tubular portion 12a.

As illustrated in FIG. 7, the second hinge unit 15 comprises a lock releasing button 16, a fixed disk 41, a second fixed tube 42, a screwed coil spring 43, a third disk 44, a fourth disk 45, and a pressured coil spring 46 in the direction from Y2 to Y1.

The lock releasing button 16 comprises a button body 16e, and a flange portion 16a in the direction from Y2 to Y1. The flange portion 16a is composed of an axis 16b, an axis 16c having a smaller diameter than that of the axis 16b, and an axis 16d.

A hole 41a, and two trenches 41b positioned in the Z1, Z2 direction and elongated in the direction from Y2 to Y1 are formed in the fixed disk 41. Two trenches 41c positioned in the X1, X2 direction and elongated in the direction from Y2 to Y1 are formed in the hole 41a. As illustrated in FIG. 6, the fixed disk 41 is located within the tubular portion 11a connected to the first housing 11. Each of the two trenches 41b is coupled to each of the two projecting portions 11f formed within the tubular portion 11a, as illustrated in FIG. 8. Accordingly, the fixed disk 41 is coupled and fixed to the first housing 11.

As illustrated in FIG. 6, the second fixed tube 42 is located within the tubular portion 12a. The second fixed tube 42 is composed of an upper bottom portion 42b, a tubular portion 42c, and a bottom surface portion 42d in the direction from Y2 to Y1. In the tubular portion 42c, the pressured coil spring 46, the fourth disk 45, and the screwed coil spring 43 are contained in the direction from Y1 to Y2, as illustrated in FIG. 6. The pressured coil spring 46 is contained between the fourth disk 45 and the bottom surface portion 42d in the tubular portion 42c. A hole 42e is formed in the tubular portion 42c to be positioned in the Z1 direction of the central portion of the tubular portion 42c. The hole 42e has a length so that the fourth disk 45 may move in the direction of an axis L (Y direction). A hole 42f is formed in the upper bottom portion 42b. The snap fit portion 42a is formed in the bottom surface portion 42d.

The third disk 44 is composed of a tubular portion 44a, and a third disk body 44b in the direction from Y2 to Y1. One end of the tubular portion 44a is connected to the third disk body 44b. The other end of the tubular portion 44a is penetrated through the second fixed tube 42 and coupled to the fixed disk 41 movably in the direction of the axis L, as illustrated in FIG. 7.

The third disk body 44b is located within the second fixed tube 42. As illustrated in FIG. 7, two projecting portions 44c are formed in an end portion of the tubular portion 44a in the Y2 direction with projecting in the X1, X2 direction. The tubular portion 44a is inserted through the screwed coil spring 43 and the hole 42f formed in the upper bottom portion 42b of the second fixed tube 42. Each of the two projecting portions 44c is then coupled to each of the two trenches 41c formed in the fixed disk 41.

Within the second fixed tube 42, both ends of the screwed coil spring 43 are fixed to a stopping portion 42g formed in the upper bottom portion 42b, a stopping portion 44d formed in the third disk body 44b, respectively. The screwed coil spring 43 thereby rotatably pushes the second fixed tube 42 with respect to the third disk body 44b, as illustrated in FIG. 6.

A hole 44e is formed in the tubular portion 44a and the third disk body 44b so that the axis 16b may be inserted up to a predetermined position of the tubular portion 44a and be coupled to the position. Accordingly, a predetermined distance (space) A1 is obtained between the button body 16e of the lock releasing button 16 and the fixed disk 41, as illustrated in FIG. 6.

Herein, each length in the Y direction of the two trenches 41c and the two projecting portions 44c is larger than the predetermined distance (space) A1. The predetermined distance (space) A1 corresponds to a stroke, when the button body 16e of the lock releasing button 16 is pushed from Y2 direction to Y1 direction. Two convex portions 44f positioned in the X1, X2 direction are formed in one surface in the Y1 direction of the third disk body 44b.

The fourth disk 45 is composed of a tubular portion 45b, and a fourth disk body 45c in the direction from Y2 to Y1. The tubular portion 45b has the same outer diameter as that of the axis 16b. A hole 45d through which the axis 16c is inserted is formed in the tubular portion 45b. A hole (not shown) through which a head of the axis 16c is inserted is formed in the fourth disk body 45c. The head of the axis 16c is then fixed by caulking. The lock releasing button 16 is thereby coupled to the fourth disk 45. The tubular portion 45b is inserted into the tubular portion 44a of the third disk 44 and the hole 44e formed in the third disk body 44b up to the above-mentioned predetermined position of the tubular portion 44a. Two concave portions 45e positioned in the X1, X2 direction are formed in one surface of the fourth disk body 45c in the Y2 direction. Each of the two concave portions 45e is coupled to each of the two convex portions 44f of the third disk body 44b. Namely, the fourth disk 45 is coupled with the third disk 44 within the second fixed tube 42.

The pressured coil spring 46 pushes the fourth disk 45 to the third disk 44 so as to keep the coupling of the fourth disk 45 with the third disk 44 within the second fixed tube 42, when the second housing 12 is at the first angle position.

A guiding rib 45a positioned in the Z1 direction is formed in the fourth disk body 45c with being elongated in the direction from Y2 to Y1. The guiding rib 45a is inserted through the hole 42e formed in the tubular portion 42c of the second fixed tube 42. A part of the guiding rib 45a is projected from the second fixed tube 42 and moves over a length of the hole 42e. Herein, the specific length in the Y direction of the guiding trench 12d illustrated in FIG. 8 is larger than the length of the guiding rib 45a in the Y direction. The length of the hole 42e in the Y direction is larger than the sum of the specific length in the Y direction of the guiding trench 12d and the length of the guiding rib 45a in the Y direction.

As illustrated in FIG. 6, when the folding portable telephone according to the preferred embodiment is in a closed condition, the fourth disk 45 is pushed towards the third disk 44 (Y2 direction) by the pushing force of the pressured coil spring 46. As a result, the two concave portions 45e of the fourth disk 45 and the two convex portions 44f of the third disk 44 are coupled (interlocked) to each other (locked condition). The lock releasing button 16 is coupled to the third disk 44 and is inserted through the fixed disk 41, the second fixed tube 42, and the third disk 44. The lock releasing button 16 further has the flange portion 16a for pushing the fourth disk 45 towards the axis of rotation. Consequently, the lock releasing button 16 is always subjected to the pushing force by the pressured coil spring 46 through the fourth disk 45. Further, as mentioned before, both ends of the screwed coil spring 43 are fixed to the second fixed tube 42, the third disk 44, respectively. When the folding portable telephone according to the preferred embodiment is in a closed condition, the two concave portions 45e of the fourth disk 45 and the two convex portions 44f of the third disk 44 are coupled (interlocked) to each other (locked condition) by the pushing force of the pressured coil spring 46 in the axial direction. Accordingly, the screwed coil spring 43 is screwed to keep the condition that the rotatably pushing force is stored.

Next, by pushing the lock releasing button 16 in, the fourth disk 45 coupled to the lock releasing button 16, with resisting the pushing force of the pressured coil spring 46, moves in the axial direction (from Y2 direction to Y1 direction) within the second fixed tube 42. At the same time, the guiding rib 45a formed in the fourth disk 45 is coupled to the guiding trench 12d formed in the inner surface of the tubular portion 12a. As a result, the second fixed tube 42 and the second housing 12 become coupled to each other. Further, during the pushing the lock releasing button 16 in, the two convex portions 44f of the third disk 44 are also pushed. When the two convex portions 44f of the third disk 44 are pushed, the second fixed tube 42 is rotated by the rotatably pushing force of the screwed coil spring 43. When the second fixed tube 42 is rotated, the locked condition between the two concave portions 45e of the fourth disk 45 and the two convex portions 44f of the third disk 44 is released. When the locked condition between the fourth disk 45 and the third disk 44 is released, the fourth disk 45 is rotated by the rotatably pushing force of the screwed coil spring 43. As a result, a toruque for opening the first and the second housings 11 and 12 from each other are applied thereon. Accordingly, the first and the second housings 11 and 12 are opened at a stretch up to the opened condition.

Next, by closing the first and the second housings 11 and 12 to each other from this opened condition, the screwed coil spring 43 is screwed again to obtain the rotatably pushing force. At the same time, the two concave portions 45e of the fourth disk 45 and the two convex portions 44f of the third disk 44 are coupled (interlocked) to each other, so that the folding portable telephone according to the preferred embodiment comes to the condition that the rotatably pushing force of the screwed coil spring 43 is stored.

Next, description proceeds to a method (2) of opening the folding portable telephone according to the preferred embodiment without pushing the lock releasing button 16 (hold the first and the second housings 11 and 12 by left hand and right hand, respectively, and open the first and the second housings 11 and 12 by using both the hands).

As mentioned in the preamble of the instant specification, according to the conventional folding portable telephone having the one touch open function, opening force is automatically applied on the folding portable telephone, in a case that it is opened by a hand of a user himself without pushing the lock releasing button. As a result, even in the case, the folding portable telephone having the one touch open function is inevitably opened at a stretch from the closed condition thereof into the opened condition thereof. On the other hand, according to the second hinge unit 15 having the one touch open function used in the folding portable telephone of the preferred embodiment of the present invention, the one touch open function becomes available, only when the lock releasing button 16 is pushed. Namely, if the lock releasing button 16 has not yet been pushed, the guiding rib 45a formed in the fourth disk 45 is not coupled to the second housing 12. As a result, the first and the second housings 11 and 12 are capable of being rotated from each other by using both hands of the user, in no relation to the rotatably pushing force of the screwed coil spring 43.

Therefore, when the user makes the first and the second housings 11 and 12 rotate from each other like a method of (2), without pushing the lock releasing button 16, only the function of the first hinge unit 14 becomes available. Namely, the function of the first hinge unit 14 is as follows; when an angle β between the first and the second housings 11 and 12 is in a range between the dosed condition and the opened condition [θ1<β<(α−θ2)], (herein, θ1 and θ2 can be freely determined, but it is generally desirable that both the θ1 and θ2 are 10° to 20°, respectively), a function to keep the angle β (free stop function). In addition, in an angle θ1 immediately before the closing, a rotating force (what is called, inhaling force) towards the closed direction is generated. On the other hand, in an angle immediately before the opened condition (160°−θ2), the inhaling force is generated towards the opened direction. As a result, keeping force both at the dosed and the opened conditions is obtained. Accordingly, when the user watches the display portion with the folding portable telephone being put on a desk, an angle between the first and the second housings 11 and 12 can be kept at a free angle position for readily watching the display portion.

As shown in FIG. 3A, when an angle between the first and the second housings 11 and 12 is in a range between 0° and θ1 degree, or when the angle between the first and the second housings 11 and 12 is in a range between (α−θ2) degree and α, an inclined surface of the convex portion 31e of the first disk 31 and an inclined surface of the concave portion 32e of the second disk 32 come into contact with each other. The convex portion 31e and the concave portion 32e are pressure welded to each other by the pushing force of the pressured coil spring 34. Consequently, when an angle between the first and the second housings 11 and 12 is in a range between 0° and θ1 degree, a closing force (rotating force towards the dosed direction) is always generated so that the convex portion 31e and the concave portion 32e may be fitted to each other. On the other hand, when the angle between the first and the second housings 11 and 12 is in a range between (α−θ2) and α, an opening force (rotating force towards the opened direction) is always generated so that the convex portion 31e and the concave portion 32e may be fitted to each other similarly to the above. Accordingly, when the folding portable telephone is folded, as approaching the angle θ1, the first and the second housings 11 and 12 are closed by the closing force, as if the first and the second housings 11 and 12 are inhaled to each other. On the contrary, when the folding portable telephone is opened, as approaching the angle (α−θ2) near the opened condition, the first and the second housings 11 and 12 are opened by the opening force.

Next, as shown in FIG. 3B, when an angle between the first and the second housings 11 and 12 is at intermediate angle β[θ1<β<(α−θ2)], the convex portion 31e of the first disk 31 comes into contact with a plane other than the concave portion 32e of the second disk 32. As a result, the convex portion 31e and the plane other than the concave portion 32e of the second disk 32 are pressure welded to each other by the pushing force of the pressured coil spring 34. Therefore, when an angle between the first and the second housings 11 and 12 is at intermediate angle β[θ1<β<(α−θ2)], keeping force for keeping the angle β is generated so that the convex portion 31e and the plane other than the concave portion 32e of the second disk 32 may be pressure welded to each other. Accordingly, an angle β between the first and the second housings 11 and 12 can be kept at a free angle position.

Besides, the first hinge unit 14 informs a user of the result of fitting of the first disk 31 to the second disk 32 by sound, when the convex portion 31e of the first disk 31 becomes fitted to the concave portion 32e of the second disk 32. As illustrated in FIG. 5, a predetermined clearance is kept between the projecting portion 12f formed in inner surface of the tubular portion 12b and the trench 32b of the second disk 32. As a result, when the convex portion 31e of the first disk 31 becomes fitted to the concave portion 32e of the second disk 32, rotation speed of the second disk 32 is increased. A sound is caused to occur due to the collision of the projecting portion 12f formed in inner surface of the tubular portion 12b with the trench 32b of the second disk 32. Consequently, the first hinge unit 14 is capable of generating a click sound voluntarily near the opened and closed condition.

Thus, in the folding portable telephone of the present invention, one touch open function becomes operable, when the lock releasing button is pushed. On the contrary, the one touch open function becomes invalid and a free stop function becomes operable, when the folding portable telephone is opened without pushing the lock releasing button. Therefore, the folding portable telephone is capable of selectively using the free stop function and the one touch open function, so that utility of the folding portable telephone is improved.

The folding portable telephone has a structure capable of being opened by one hand, so that a user can enter into talking condition quickly and so operability of the folding portable telephone is improved.

The folding portable telephone is capable of selectively using the free stop function and the one touch open function, so that the folding portable telephone is not in danger of being dropped and so burden for a user can be lightened to improve maintenance of the folding portable telephone.

While this invention has thus far been described in conjunction with a preferred embodiment thereof, it will now be readily possible for one skilled in the art to put this invention into effect in various other manners. For example, both the function of the first hinge unit 14 and the function of the second hinge unit 15 can be realized only by one hinge unit.

What is claimed is:

1. A folding portable telephone comprising:
   a first housing;
   a second housing; and
   a hinge portion which is fixed on said first housing and which is for rotatably coupling said second housing to said first housing;
   said hinge portion having an operating portion;
   said second housing being opened from a first angle position for indicating a closed condition to a second angle position for indicating a predetermined angle position, responsive to an operation of said operating portion; and said second housing being kept at one of said first angle position, said second angle position, and a third angle position between said first and said second angle positions, when an operation of said operating portion is not made, wherein said hinge portion comprises:

a first hinge portion which is located on an end of said hinge portion and has said operating portion and by which said second housing rotates from said first angle position to said second angle position, responsive to an operation of said operating portion; and a second hinge portion which is located on the other end of said hinge portion and is capable of rotating said second housing from said first angle position to said second angle position and by which said second housing is kept at one of said first angle position, said second angle position, and said third angle position, when said operation of said operating portion is not made, wherein, when said first housing is separated from said second housing by an amount less than a fourth angle position, said second housing is pushed against said first housing by said first hinge portion, to cause said folding portable telephone apparatus to be in a fully closed state, and wherein, when said first housing is separated from said second housing by an amount greater than a fifth angle position, said second housing is pulled away from said first housing by said first hinge portion to a maximum rotational amount corresponding to said second angle position, to cause said folding portable telephone apparatus to be in a fully open state, wherein said first angle position<said fourth angle position<said third angle position<said fifth angle position<said second angle position.

2. A folding portable telephone as claimed in claim 1, wherein when said second housing is manually moved by a user of said folding portable telephone to said third angle position from either said first angle position or said second angle position, said operating portion is deactivated such that operation of said operating portion while in said third angle position will not result in any movement of said second housing relative to said first housing.

3. A folding portable telephone comprising:

a first housing;

a second housing; and a hinge portion which is fixed on said first housing and which is for rotatably coupling said second housing to said first housing;

said hinge portion having an operating portion;

said second housing being opened from a first angle position for indicating a closed condition to a second angle position for indicating a predetermined angle position, responsive to an operation of said operating portion; and said second housing being kept at one of said first angle position, said second angle position, and a third angle position between said first and said second angle positions, when an operation of said operating portion is not made, wherein said hinge portion comprises:

a first hinge portion which is located on an end of said hinge portion and has said operating portion and by which said second housing rotates from said first angle position to said second angle position, responsive to an operation of said operating portion; and a second hinge portion which is located on the other end of said hinge portion and is capable of rotating said second housing from said first angle position to said second angle position and by which said second housing is kept at one of said first angle position, said second angle position, and said third angle position, when said operation of said operating portion is not made, said first hinge portion co-axially rotatably coupling a first housing side coupling portion integrally formed in the first housing with a second housing side coupling portion integrally formed in the second housing;

a guiding trench being formed in the second housing side coupling portion;

said first hinge portion comprising:

a fixed disk which is fixed within said first housing side coupling portion;

a first fixed tube which is located within said second housing side coupling portion;

a first disk which is located within said first fixed tube;

a first coupling portion of which one end is connected to said first disk and of which the other end penetrates through said first fixed tube and is coupled to said fixed disk movably in the direction of one axis;

a first spring of which both ends are fixed to said first fixed tube, said first disk, respectively, within said first fixed tube, and which thereby pushes said first fixed tube rotatably against said first disk;

a second disk which is hooked to said first disk within said first fixed tube, a hole being formed in said first fixed tube to have a length over which said second disk moves in the direction of one axis, a guiding rib being formed in said second disk so that said second disk may penetrate said hole and move over said length of said hole;

a lock releasing button which is corresponding to said operating portion and is coupled to said second disk, said lock releasing button, when said lock releasing button is pushed on, making said second disk move in the direction of one axis and then making said first fixed tube and said second disk rotate by rotatably pushing force of said first spring, said lock releasing button thereby releasing said second disk from being hooked to said first disk; and responsive to pushing on of said lock releasing button, said guiding rib being hooked to said guiding trench of said second housing side coupling portion, said second housing rotating from said first angle position to said second angle position.

4. A folding portable telephone as claimed in claim 3, wherein said first hinge portion further comprises a second spring which pushes said second disk to said first disk within said first fixed tube so that said second disk may be kept hooked to said first disk, when said second housing is at said first angle position.

5. A folding portable telephone as claimed in claim 4, wherein said second hinge portion co-axially rotatably couples a third housing side coupling portion integrally formed in said first housing with a fourth housing side coupling portion integrally formed in said second housing, and wherein a projecting portion is formed in said fourth housing side coupling portion, said second hinge portion comprising:

a shaft which is formed in line with said one axis;

a third disk having a trench into which said projecting portion of said fourth housing side coupling portion is inserted, said third disk rotating with said shaft being an axis of rotation;

a second fixed tube which is fixed within said third housing side coupling portion;

a fourth disk which is formed within said second fixed tube, said fourth disk being hooked to said third disk, when said second housing is at said first or said second angle position, on the contrary, said fourth disk being not hooked to said third disk, when said second housing is at said third angle position; and a third spring which is formed within said second fixed tube, said third spring pushing said fourth disk to said third disk so that said second housing may be kept at one of said first angle position, said second angle position, and said third angle position.

6. A folding portable telephone as claimed in claim 5, wherein said second hinge portion informs an user of the result of hooking of said fourth disk to said third disk by sound, when said fourth disk is hooked to said third disk.

7. A folding portable telephone as claimed in claim 6, wherein a predetermined clearance is kept between said projecting portion of said fourth housing side coupling portion and said trench of said third disk, said sound for informing said user of the result of hooking being a sound generated by a collision of said projecting portion with said trench, when said fourth disk is hooked to said third disk.

8. A folding portable telephone as claimed in claim 3, wherein said second hinge portion co-axially rotatably couples a third housing side coupling portion integrally formed in said first housing with a fourth housing side coupling portion integrally formed in said second housing, and wherein a projecting portion is formed in said fourth housing side coupling portion, said second hinge portion comprising:

a shaft which is formed in line with said one axis;

a third disk having a trench into which said projecting portion of said fourth housing side coupling portion is inserted, said third disk rotating with said shaft being an axis of rotation;

a second fixed tube which is fixed within said third housing side coupling portion;

a fourth disk which is formed within said second fixed tube, said fourth disk being hooked to said third disk, when said second housing is at said first or said second angle position, on the contrary, said fourth disk being not hooked to said third disk, when said second housing is at said third angle position; and a third spring which is formed within said second fixed tube, said third spring pushing said fourth disk to said third disk so that said second housing may be kept at one of said first angle position, said second angle position, and said third angle position.

9. A folding portable telephone as claimed in claim 8, wherein said second hinge portion informs an user of the result of hooking of said fourth disk to said third disk by sound, when said fourth disk is hooked to said third disk.

10. A folding portable telephone as claimed in claim 9, wherein a predetermined clearance is kept between said projecting portion of said fourth housing side coupling portion and said trench of said third disk, said sound for informing said user of the result of hooking being a sound generated by a collision of said projecting portion with said trench, when said fourth disk is hooked to said third disk.

\* \* \* \* \*